United States Patent
Rajavelu

(10) Patent No.: US 11,770,694 B2
(45) Date of Patent: Sep. 26, 2023

(54) METHODS, SYSTEMS, AND COMPUTER READABLE MEDIA FOR VALIDATING LOCATION UPDATE MESSAGES

(71) Applicant: Oracle International Corporation, Redwood Shores, CA (US)

(72) Inventor: Srinivasan Rajavelu, Dubai (AE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/099,683

(22) Filed: Nov. 16, 2020

(65) Prior Publication Data

US 2022/0159445 A1   May 19, 2022

(51) Int. Cl.
   *H04W 8/12*   (2009.01)
   *H04W 8/04*   (2009.01)
   *H04W 8/18*   (2009.01)

(52) U.S. Cl.
   CPC .............. *H04W 8/12* (2013.01); *H04W 8/04* (2013.01); *H04W 8/18* (2013.01)

(58) Field of Classification Search
   CPC ........... H04W 8/12; H04W 8/04; H04W 8/18; H04W 8/02
   See application file for complete search history.

(56) References Cited

U.S. PATENT DOCUMENTS

| | | |
|---|---|---|
| 6,091,958 A | 7/2000 | Bergkvist et al. |
| 6,151,503 A | 11/2000 | Chavez |
| 6,292,666 B1 | 9/2001 | Siddiqui et al. |
| 6,308,075 B1 | 10/2001 | Irten et al. |
| 6,343,215 B1 | 1/2002 | Calabrese et al. |

(Continued)

FOREIGN PATENT DOCUMENTS

| | | |
|---|---|---|
| CN | 101277541 A | 10/2008 |
| CN | 10135561 A | 1/2009 |

(Continued)

OTHER PUBLICATIONS

Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Fowarding Interface," (Unpublished, filed Dec. 21, 2020).

(Continued)

*Primary Examiner* — Barry W Taylor
(74) *Attorney, Agent, or Firm* — Jenkins, Taylor & Hunt, P.A.

(57) ABSTRACT

The subject matter described herein includes a methods, systems, and computer readable media for validating location update messages. One method includes receiving, by a signaling firewall from a non-home network, an ingress location update request message related to a mobile subscriber, querying a directional state database to obtain predicted country trajectory data associated with the mobile subscriber, and comparing the obtained predicted country trajectory data with country code information included in the ingress location update request message. The method further includes validating the ingress location update request message if the predicted country trajectory data and the country code information match.

20 Claims, 6 Drawing Sheets

| SUBSCRIBER ID | DIRECTION | NEIGHBORING COUNTRY | COLOR CODE |
|---|---|---|---|
| HASH (SUB ID) | NORTH | NC-"N" | RED |
| | SOUTH | NC-4 | RED |
| | EAST | NC-2 | RED |
| | WEST | NC-6 | RED |
| | NE | NC-1 | GREEN |
| | SE | NC-3 | RED |
| | SW | NC-5 | RED |
| | NW | NC-7 | RED |

(56) References Cited

U.S. PATENT DOCUMENTS

| | | |
|---|---|---|
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1* | 3/2012 | Leonard .................. G01S 19/05 |
| | | 455/456.2 |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B2 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,637,838 B1 | 4/2020 | Larios et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,265,695 B2 | 3/2022 | Shah et al. |
| 11,272,560 B1* | 3/2022 | Vivanco ............ H04W 28/0278 |
| 11,368,839 B2 | 6/2022 | Targali |
| 11,411,925 B2 | 8/2022 | Kumar et al. |
| 11,516,671 B2 | 11/2022 | Rajput et al. |
| 11,528,251 B2 | 12/2022 | Rajput et al. |
| 11,553,342 B2 | 1/2023 | Mahalank et al. |
| 11,622,255 B2 | 4/2023 | Iddya et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1* | 10/2007 | Vasudevan ............ H04W 60/04 |
| | | 455/331 |
| 2007/0281718 A1 | 12/2007 | Nooren |
| 2008/0004047 A1 | 1/2008 | Hill et al. |
| 2008/0020704 A1* | 1/2008 | Costa ................ H04M 15/8038 |
| | | 455/3.06 |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1* | 3/2008 | Olson .................. H04W 36/32 |
| | | 455/440 |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1* | 7/2009 | Abramson .............. H04W 8/02 |
| | | 455/558 |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1* | 5/2011 | Brisebois .............. H04W 48/16 |
| | | 455/434 |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1* | 10/2011 | Arzelier ............ H04M 1/72436 |
| | | 704/8 |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1* | 5/2012 | Grainger .................. G01S 5/02 |
| | | 455/456.3 |
| 2012/0131121 A1 | 5/2012 | Snyder et al. |
| 2012/0202481 A1* | 8/2012 | Martin .............. H04W 36/0061 |
| | | 455/423 |
| 2012/0203663 A1 | 8/2012 | Sinclair et al. |
| 2012/0207015 A1 | 8/2012 | Marsico |
| 2013/0035118 A1* | 2/2013 | Hamano .............. H04W 4/021 |
| | | 455/421 |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1* | 10/2013 | Walker ................ H04N 21/8456 |
| | | 725/62 |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1* | 2/2015 | Kilpatrick, II ...... H04W 36/245 |
| | | 455/561 |
| 2015/0081579 A1 | 3/2015 | Brown et al. |
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |

(56) References Cited

U.S. PATENT DOCUMENTS

| | | |
|---|---|---|
| 2016/0119773 A1* | 4/2016 | Xu .................. H04W 36/14 455/432.2 |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1* | 1/2017 | Donovan ............ H04L 65/1083 |
| 2017/0142547 A1 | 5/2017 | Hou et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0245280 A1* | 8/2017 | Yi ........................ H04K 3/00 |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1* | 10/2017 | Peylo ................ H04L 63/1458 |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1* | 4/2018 | Chae .................. H04W 4/026 |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1* | 1/2019 | Russell ............... H04M 15/47 |
| 2019/0037484 A1* | 1/2019 | Davies ................ H04W 48/04 |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364064 A1 | 11/2019 | Gupta et al. |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1* | 4/2020 | Nayak ................ H04W 64/006 |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1 | 10/2020 | He et al. |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1* | 7/2021 | Li .................... H04W 36/0055 |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput et al. |
| 2022/0104112 A1 | 3/2022 | Rajput et al. |
| 2022/0124079 A1 | 4/2022 | Patil et al. |
| 2022/0124479 A1 | 4/2022 | Iddya |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0174544 A1 | 6/2022 | Taft et al. |
| 2022/0182923 A1 | 6/2022 | Yao et al. |
| 2022/0191763 A1* | 6/2022 | Roeland .......... H04W 36/00837 |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0240084 A1 | 7/2022 | Speidel et al. |
| 2022/0256312 A1* | 8/2022 | Kim ...................... H04W 64/00 |
| 2022/0264260 A1 | 8/2022 | Chaurasia et al. |
| 2022/0272069 A1 | 8/2022 | Verma et al. |
| 2022/0272541 A1 | 8/2022 | Rajput et al. |
| 2022/0369091 A1 | 11/2022 | Nair |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 108307385 A | 7/2018 |
| CN | 110035433 A | 7/2019 |
| CN | 110035433 A | 7/2019 |
| CN | 110800322 B | 5/2021 |
| CN | 201880040478.3 | 4/2022 |
| CN | ZL202080007649.X | 9/2022 |
| EP | 1 067 492 A2 | 1/2001 |
| EP | 1 906 682 A1 | 4/2008 |
| EP | 2 204 955 A1 | 7/2010 |
| EP | 2 785 125 B1 | 1/2018 |
| EP | 3 493 569 A1 | 6/2019 |
| EP | 3 646 630 B1 | 8/2021 |
| EP | 3 662 630 | 8/2021 |
| EP | 3954146 A1 | 2/2022 |
| EP | 3 821 630 B1 | 7/2022 |
| EP | 3954146 B1 | 6/2023 |
| ES | 2 548 005 T3 | 10/2015 |
| GB | 2503973 A | 1/2014 |
| IN | 401247 | 7/2022 |
| JP | 2008-053808 A | 3/2008 |
| JP | 7038148 B2 | 3/2022 |
| JP | 7113147 B | 8/2022 |
| JP | 7133010 | 8/2022 |
| JP | 7133010 B2 | 9/2022 |
| JP | 7198339 B | 12/2022 |
| JP | 7246418 B2 | 3/2023 |
| WO | WO 01/88790 A1 | 11/2001 |
| WO | WO 2001/088790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |

(56) References Cited

FOREIGN PATENT DOCUMENTS

| | | |
|---|---|---|
| WO | WO 2010/021386 A1 | 2/2010 |
| WO | WO-2010/021886 A1 | 2/2010 |
| WO | WO 2010/045646 A2 | 4/2010 |
| WO | WO 2010/105099 A2 | 9/2010 |
| WO | WO 2011/010640 A1 | 1/2011 |
| WO | WO 2011/047382 A2 | 4/2011 |
| WO | WO 2016/201990 A1 | 12/2016 |
| WO | WO 2017/082532 A1 | 5/2017 |
| WO | WO 2017082532 A1 | 5/2017 |
| WO | WO 2019/158028 A1 | 8/2018 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO-2020036883 A1 | 2/2020 |
| WO | WO 2020/164763 | 8/2020 |
| WO | WO 2020/164763 A1 | 8/2020 |
| WO | WO 2020/174121 A1 | 9/2020 |
| WO | WO 2020/179665 A1 | 9/2020 |
| WO | WO 2020/210015 A1 | 10/2020 |
| WO | WO 2022/257018 A1 | 12/2020 |
| WO | WO 2021/138072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| WO | WO 2022/182448 A1 | 9/2022 |
| WO | WO 2022/240582 A1 | 11/2022 |

OTHER PUBLICATIONS

Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).

Non-Final Office Action for U.S. Appl. No. 16/024,422 (dated Jul. 8, 2020).

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 18731923.1 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

"FS.19 Diameter Interconnect Security," GSMA, pp. 1-3 (Dec. 20, 2019).

Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).

Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).

Commonly-assigned, co-pending U.S. Appl. No. 16/024,422 for "Methods, Systems, and Computer Readable Media for Network Node Validation," (Unpublished, filed Jun. 29, 2018).

Non-Final Office Action for U.S. Appl. No. 15/408,155 (dated Jan. 9, 2018).

Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)" (Unpublished filed Aug. 1, 2017).

Commonly-assigned, co-pending U.S. Appl. No. 15/636,118 for "Methods, Systems, and Computer Readable Media for Validating User Equipment (UE) Location," (Unpublished, filed Jun. 28, 2017).

Commonly-assigned, co-pending U.S. Appl. No. 15/408,155 for "Methods, Systems, and Computer Readable Media for Validating a Redirect Address in a Diameter Message," (Unpublished, filed Jan. 17, 2017).

"Edge Router (DEA)," http://www.mavenir.com/our-products/mobile/edge-router-dea, pp. 1-7 (Copyright 2017).

Commonly-assigned, co-pending U.S. Appl. No. 15/376,631 for "Methods, Systems, and Computer Readable Media for Validating Subscriber Location Information," (Unpublished, filed Dec. 12, 2016).

Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLS interface (3GPP TS 29.171 V 11.4.0.

Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLq interface (3GPP TS 29.172 version.

Commonly-assigned, co-pending U.S. Appl. No. 13/047,287 (Unpublished, filed on Mar. 14, 2011).

"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).

"Draft LS on network verification of UE provided location," 3GPP TSG SA WG2 Meeting #81, pp. 1 (Oct. 11-15, 2010).

Notification of Transmittal of the International Search Report and the Written Opinion of the International Searching Authority, or the Declaration for International Application No. PCT/US2009/061187 (dated May 17, 2010).

(56) References Cited

OTHER PUBLICATIONS

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)" 3GPP TS 29.272. V8.1.1. pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Dierks et al., "The Transport Layer Security (TLS) Protocol Version 1.2," RFC 5246, pp. 1-208 (Aug. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Housley et al., "Internet X.509 Public Key Infrastructure Certificate and Certificate Revocation List (CRL) Profile," RFC 3280, pp. 1-258 (Apr. 2002).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.
Communication under Rule 71 (3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).
Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
First Office Action for Japanese Application Serial No. 2021545918 (dated Mar. 8, 2022).
Non-Final Office Action for U.S. Appl. No. 17/129,487 (dated Mar. 21, 2022).
Decision to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
"5G; Procedures for the 5G System (3GPP TS 23.502 version 15.3.0 Release 15)," ETSI TS 123 502, V15.3.0, pp. 1-330 (Sep. 2018).
Commonly-assigned, co-pending U.S. Appl. No. 17/185,934 for "Methods, Systems, and Computer Readable Media for Mitigating Location Tracking and Denial of Service (DoS) Attacks that Utilize Access and Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G system (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects: Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; State 3 (Release 17)," 3GPP TS 29.571, V17.0.0, pp. 1-258 (Dec. 2020).
"3rd Generation Partnership Project; Technical Specification Group Core Network and Terminals; 5G System; Public Land Mobile

(56) References Cited

OTHER PUBLICATIONS

Network (PLMN) Interconnection; Stage 3 (Release 16)," 3GPP TS 29.573, V16.5.0, pp. 1-253 (Dec. 2020).
"3rd Generation Partnership Project; Technical Specification Group Core Network and Terminals; 5G System; Location Management Services; Stage 3 (Release 16)," 3GPP TS 29.573, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518 V17.0.0, pp. 1-298 (Dec. 2020).
"3rd Generation Partnership Project; Technical Specification Group Services and System Aspects; System architecturee for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DLR—Tel!—SMS Test Platform and SMS services. Nov. 6, 2020, pp. 1-6, https://telqtele.com/sms-fake-delivery-receipts-fake-dir/.
Communication of European publication number and information on the application of Article 67(3) EPC for European Application Serial No. 18756018.0 (dated May 13, 2020).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
DeKok, "The Network Access Identifier," Internet Engineering Task Force (IETF), RFC 7542, pp. 1-30 (May 2015).
Croft, N., "On Forensics: A Silent SMS Attack," Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71(3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
Communication of European publication No. and information on the application of Article 67(3) EPC for European Application Serial No. 18731923.1 (dated Apr. 8, 2020).
"3rd Generation Partnership Project; Technical Specification Group Services and System Aspects; Security architecture and procedures for 5G system (Release 16)," 3GPP TS 33.501, V16.2.0, pp. 1-227 (March 2020).
Non-Final Office Action for U.S. Patent Application Serial No. 16/100,172 (dated Mar. 6, 2020).
Notice of Allowance and Fee(s) Due and Examiner-Initiated Interview Summary for U.S. Appl. No. 16/732,098 (dated Feb. 13, 2020).
Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).
Notification of Transmittal of the International Search Report and the Written Opinion of the International Searching Authority, or the Declaration for International Application Serial No. PCT/US2019/042203 (dated Nov. 11, 2019).
Applicant-Initiated Interview Summary for U.S. Appl. No. 15/666,300 (dated Oct. 29, 2019).
Final Office Action for U.S. Appl. No. 16/100,172 (dated Oct. 3, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).
Decision on Appeal for U.S. Appl. No. 13/047,287 (dated Jun. 18, 2019).

(56) References Cited

OTHER PUBLICATIONS

Notification of Transmittal of the International Search Report and the Written Opinion of the International Searching Authority, or the Declaration for International Patent Application No. PCT/US2019/018990 (dated May 8, 2019).
Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Non-Final Office Action for U.S. Appl. No. 16/100,172 (dated Apr. 11, 2019).
Notice of Allowability for U.S. Appl. No. 16/035,008 (dated Mar. 18, 2019).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Sahu et al., "How 5G Registration Works," http://5gblogs.com/5g-registration/, 10 pages (Oct. 12, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for international Application No. PCT/US2018/030319 (dated Aug. 20, 2018).
Final Office Action for U.S. Appl. No. 15/408,155 (dated Jul. 26, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
"Signalling Security in Telecom SS7/Diameter/5G," Enisa, pp. 1-30 (Mar. 2018).
Examiners Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/376,631 (dated Jan. 9, 2018).
Final Office Action for U.S. Appl. No. 15/376,631 (dated Nov. 28, 2017).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).

"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom__content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLS interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)." ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013.
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS): Service description; Stage1 (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).

(56) References Cited

OTHER PUBLICATIONS

Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron Centron GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," MeterIng.com, http://www.metering.com/node/13550 Sep. 19, 2008, pp. 1-2 (Downloaded from the internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
Notification of Transmittal of the International Search Report and the Written Opinion of the International Searching Authority, or the Declaration for International Application No. PCT/US2009/061187 (May 17, 2010).
"3rd Generation Partnership Project: Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-52 (Jan. 2009).
"3rd Generatian Partnership Project; Technical Specification Group Core Network; Unstructured Supplementary Service Data (USSD); Stage 2 (Release 8)," 3GPP TS 23.090, V8.0.0, pp. 1-32 (Dec. 2008).
Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).

Notification of Transmittal of the International Search Report and the Written Opinion of the International Searching Authority, or the Declaration for International Application No. PCT/US2021/042660 (dated Oct. 26, 2021).
Hearing Notice of Indian Application Serial No. 201947647367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (dated Apr. 21, 2021).
"3rd Generation Partnership Project; Technical Specification Group Services and System Aspects; Security Aspects: Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-assigned, co-pending U.S. Appl. No. 17/129,487 for "Methods, Systems, and Computer Readable Media for Ingress Message Rate Limiting," (Unpublished, filed Dec. 21, 2020).
Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).

(56) References Cited

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-assigned, co-pending U.S. Appl. No. 17/099,683 for "Methods, Systems, and Computer Readable Media for Validating Location Update Messages," (Unpublished, filed Nov. 16, 2020).
Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).
Notice of Allowance and Fee(s) Due and Examiner-Initiated Interview Summary for U.S. Appl. No. 16/379,488 (dated Oct. 23, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Network Function Repository Services; Stage 3 (Release 16)," 3GPP TS 29.510, V16.4.0 pp. 1-206 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Hearing Notice of Indian Application Serial No. 201947047367 (Oct. 11, 2021).
Decision to grant a European patent pursuant to Article 97(1) EPC for European Patent Application Serial No. 18756018.0 (dated Jul. 29, 2021).
Notification of Transmittal of the International Search Report and the Written Opinion of the International Searching Authority, or the Declaration for International Application No. PCT/US2021/029973 (Jul. 7, 2021).
Final Office Action for U.S. Appl. No. 17/123,038 (dated Mar. 9, 2023).
Supplemental Notice of Allowability for U.S. Appl. No. 17/175,260 (dated Mar. 8, 2023).
Office Communication for U.S. Appl. No. 17/125,943 (dated Mar. 1, 2023).
Notice of Allowance and Fee(s) Due for U.S. Appl. No. 17/175,260 (dated Feb. 27, 2023).
Applicant Initiated Interview Summary for U.S. Appl. No. 17/008,528 (dated Feb. 21, 2023).

Intent to Grant for Japanese Patent Application No. 2020-572898 (dated Feb. 14, 2023).
Intent to Grant for Japanese Patent Application No. 2021-506739 (dated Jan. 24, 2023).
Notice of Allowance and Fee(s) Due for U.S. Appl. No. 17/319,023 (dated Feb. 10, 2023).
Non-Final Office Action for U.S. Appl. No. 17/125,943 (dated Feb. 9, 2023).
Supplemental Notice of Allowability for U.S. Appl. No. 17/076,482 (dated Jan. 19, 2023).
Non-Final Office Action for U.S. Appl. No. 17/129,441 (dated Jan. 19, 2023).
Intent to Grant for European Patent Application No. 18705270.9 (dated Dec. 8, 2022).
Applicant Initiated Interview Summary for U.S. Appl. No. 17/319,023 (dated Jan. 10, 2023).
Telekom, "N32 Message Anti-Spoofing within the SEPP", 3GPP TSG SA WG3 (Security) Meeting #91, S3-181480, pp. 1-2 (dated Apr. 2018).
Huawei, "New Annex for the SEPP in TR 33.926", 3GPP TSG-SA WG3 Meeting #95-BIS, S3-192180, pp. 1-5 (Jun. 2019).
"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71 (3) EPC Intention to Grant for European Patent Application Serial No. 20 720 580.8 (dated Dec. 23, 2022).
Non-Final Office Action for U.S. Appl. No. 17/095,420 (dated Jan. 3, 2023).
Notice of Allowance and Fee(s) Due for U.S. Appl. No. 17/076,482 (dated Dec. 1, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Non-Final Office Action for U.S. Appl. No. 17/008,528 (dated Nov. 10, 2022).
Notification of reasons for refusal for Japanese Patent Application No. 2020-572898 (dated Oct. 25, 2022).
Advisory Action for U.S. Appl. No. 17/076,482 (dated Oct. 25, 2022).
Communication of European publication number and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial. No. 2020-505462 (dated Aug. 2, 2022).
Non-Final Office Action for U.S. Appl. No. 17/319,023 (dated Sep. 28, 2022).
Non-Final Office Action for U.S. Appl. No. 17/123,038 (dated Sep. 30, 2022).
Communication of European publication number and information on the application of Article 67(3) EPC for European Patent Application Serial No. 20720580.8 (dated Jan. 19, 2022).
Non-Final Office Action for U.S. Appl. No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).

(56) References Cited

OTHER PUBLICATIONS

Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
"5G; Architecture enhancements for 5G System (5GS) to support network data analytics services (3GPP TS 23.288 version 16.4.0 Release 16)," ETSI TS 123 288, V16.4.0, pp. 1-68 (Jul. 2020).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).
Office Action for Chinese Patent Application Serial No. 202080091056.6 (dated Mar. 25, 2023).
Notice of Allowance and Fee(s) Due for U.S. Appl. No. 17/008,528 (dated Mar. 30, 2023).
Decision to Grant for European Patent Application No. 20720580.8 (dated May 11, 2023).
Applicant-Initiated Interview Summary for U.S. Appl. No. 17/123,038 (dated May 30, 2023).
Applicant-Initiated Interview Summary for U.S. Appl. No. 17/095,420 (dated May 12, 2023).
Applicant-Initiated interview Summary for U.S. Appl. No. 17/095,420 (dated May 17, 2023).
Notice of Publication for European Patent Application 21718461.3 (dated Apr. 26, 2023).

\* cited by examiner

| SUBSCRIBER ID | DIRECTION | NEIGHBORING COUNTRY | COLOR CODE |
|---|---|---|---|
| HASH (SUB ID) | NORTH | NC-"N" | RED |
| | SOUTH | NC-4 | RED |
| | EAST | NC-2 | RED |
| | WEST | NC-6 | RED |
| | NE | NC-1 | GREEN |
| | SE | NC-3 | RED |
| | SW | NC-5 | RED |
| | NW | NC-7 | RED |

FIG. 4

| SUBSCRIBER | REFERENCE CELL ID | SLIDING WINDOW ABOUT THE PREVIOUS SUBSCRIBER MOBILITY PATTERN LEARNED | DIRECTION | WEIGHT | COUNTRY |
|---|---|---|---|---|---|
| HASH (SUB ID) | 303 | WINDOW 1: CELL 303-304-305... | EAST | INCREASE OR DECREASE DEPENDING ON THE CURRENT CELL MOVEMENT PATTERN | NC-2-350$_2$ |
| | | WINDOW 2: CELL 303-304-306 | NE | | NC-1-350$_1$ |
| | | WINDOW 3: CELL 303-309-306 | NE | | NC-6-350$_6$ |
| | 302 | WINDOW 1: CELL 302-301-501... | | | |
| | | WINDOW 1: CELL 302-303-309 | | | |

FIG. 5

METHODS, SYSTEMS, AND COMPUTER READABLE MEDIA FOR VALIDATING LOCATION UPDATE MESSAGES

TECHNICAL FIELD

The subject matter described herein relates to fraud prevention in mobile communications networks. More particularly, the subject matter described herein relates to methods, systems, and computer readable media for validating location update messages.

BACKGROUND

Mobile communications networks are expanding and utilize multiple technologies and interconnects to carry signaling messages used to establish communications over the networks. Home network elements of a core network are typically not connected to foreign or visited networks. Instead, interconnect networks are used to forward signaling between the home network and other networks. In some instances, network operators can utilize time and distance related security countermeasures to determine if a mobile subscriber is actually/physically able to travel from one network (or country) to another network (or another country) within a particular transit time. However, in current telecommunication signaling security solutions, there is a high level of false positives in identifying the security threats associated with a bordering country outbound roaming mobile subscriber scenario, especially when the home country has multiple borders with neighboring countries. A hacker may take advantage of the multiple borders to update a subscriber record repository (e.g., a home subscriber server (HSS), a home location register (HLR), unified data manager (UDM)) in the home network with hostile subscriber location update with the intention to intercept the legitimate traffic. As indicated above, the identification of suspicious signaling by some network security solutions is based on a simple plausible movement check that validates the time and distance travel feasibility of the mobile subscriber from a given point to a destination point. However, in scenarios where the home network (or country) borders multiple neighboring countries that can be immediately entered, a hacker may be able to update the hostile subscriber location from a first bordering country even though the actual subscriber is in a second bordering country. In such scenarios, the home network interprets the hacker's false location update as legitimate update, whereas the actual mobile subscriber can subsequently be deemed as a hostile signaling entity.

Accordingly, there exists a need for methods, systems, and computer readable media for validating a location update message.

SUMMARY

The subject matter described herein includes a methods, systems, and computer readable media for validating location update messages. One method includes receiving, by a signaling firewall from a non-home network, an ingress location update request message related to a mobile subscriber, querying a directional state database to obtain predicted country trajectory data associated with the mobile subscriber, and comparing the obtained predicted country trajectory data with country code information included in the ingress location update request message. The method further includes validating the ingress location update request message if the predicted country trajectory data and the country code information match.

According to an aspect of the subject matter described herein, a method comprising designating the ingress location update request message as suspicious if the predicted country trajectory data and the country code information are different.

According to an aspect of the subject matter described herein, a method wherein the ingress location update request message is a Diameter update location request (ULR) message or a SS7 location update request message.

According to an aspect of the subject matter described herein, a method wherein the signaling firewall includes a Diameter routing agent (DRA), a Diameter Signaling Router (DSR), a Diameter Edge Agent (DEA), a signal transfer point (STP), a Security Edge Protection Proxy (SEPP).

According to an aspect of the subject matter described herein, a method including sending, by the signaling firewall, an alert message to a network operator in response to determining that the predicted country trajectory data and the country code information are different.

According to an aspect of the subject matter described herein, a method including extracting a mobile country code (MCC) identifier from an international mobile subscriber identity (IMSI) included in the ingress location update request message to identify a country associated with the non-home network.

According to an aspect of the subject matter described herein, a method wherein the directional state database is provisioned with user equipment location information associated with the mobile subscriber.

According to an aspect of the subject matter described herein, a method wherein the user equipment location information includes at least one of cell identifier (CID), a location area code (LAC) identifier, or a sector identifier.

According to an aspect of the subject matter described herein, a method wherein the signaling firewall is configured to send Any Time Interrogation (ATI) messages to request the user equipment location information on a periodic basis, random basis, or preconfigured time interval.

One system for validating location update messages comprises a signaling firewall including at least one processor and a directional state database local to the signaling firewall for storing location information related to a mobile subscriber. The signaling firewall of the system further includes a security signaling engine that is stored in memory of the signaling firewall and is implemented using the at least one processor for receiving from a non-home network an ingress location update request message related to a mobile subscriber, querying a directional state database to obtain predicted country trajectory data associated with the mobile subscriber, comparing the obtained predicted country trajectory data with country code information included in the ingress location update request message, and validating the ingress location update request message if the predicted In one example, designating the ingress location update request message as suspicious if the predicted country trajectory data and the country code information are different.

According to an aspect of the subject matter described herein, a system wherein the ingress location update request message is a Diameter update location request (ULR) message or a SS7 location update request message.

According to an aspect of the subject matter described herein, a system wherein the signaling firewall includes a Diameter routing agent (DRA), a Diameter Signaling Router (DSR), Diameter Edge Agent (DEA), a Signal Transfer Point (STP), a Security Edge Protection Proxy (SEPP).

According to an aspect of the subject matter described herein, a system wherein the signaling firewall is configured for sending an alert message to a network operator in response to determining that the predicted country trajectory data and the country code information are different.

According to an aspect of the subject matter described herein, a system wherein the signaling firewall is configured for extracting a mobile country code (MCC) identifier from an international mobile subscriber identity (IMSI) included in the ingress location update request message to identify a country associated with the non-home network.

According to an aspect of the subject matter described herein, a system wherein the directional state database is provisioned with user equipment location information associated with the mobile subscriber.

According to an aspect of the subject matter described herein, a system wherein the user equipment location information includes at least one of cell identifier (CID), a location area code (LAC) identifier, or a sector identifier.

According to an aspect of the subject matter described herein, a system wherein the signaling firewall is configured to send Any Time Interrogation (ATI) messages to request the user equipment location information on a periodic basis, random basis, preconfigured time interval.

One example non-transitory computer readable medium comprising computer executable instructions embodied in the non-transitory computer readable medium that when executed by at least one processor of at least one computer cause the at least one computer to perform steps comprising: receiving, by a signaling firewall from a non-home network, an ingress location update request message related to a mobile subscriber, querying a directional state database to obtain predicted country trajectory data associated with the mobile subscriber, and comparing the obtained predicted country trajectory data with country code information included in the ingress location update request message. The method further includes validating the ingress location update request message if the predicted country trajectory data and the country code information match.

According to an aspect of the subject matter described herein, a-transitory computer readable medium comprising designating the ingress location update request message as suspicious if the predicted country trajectory data and the country code information are different.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

The following terminology is used to describe the subject matter described herein for validating location update messages for outbound roaming subscribers using a signaling firewall:

Outbound roaming subscribers: Network mobile subscribers located in a first country that is entering or roaming into a neighboring country and/or non-home network (e.g., a visited or foreign network).

Home network: a network where operated by a mobile network operator with which a mobile subscriber has a subscriber subscription agreement.

Visited network: a foreign network in a neighboring country which a visiting mobile subscriber (from a home network and/or country) is roaming.

Diameter signaling router (DSR): The DSR is a Diameter signaling core network element that performs routing, traffic management, and load balancing tasks.

Diameter routing agent (DRA): A DRA is a Diameter network node that is deployed in a mobile network operator's (MNO) signaling core network and is responsible for routing traffic, security screening of roaming traffic, topology hiding, and congestion control for protecting a home network from excessive roaming traffic loads.

Signaling transfer point (STP): An STP is a node in a Signaling System No. 7 (SS7) network that routes signaling messages based on their destination point code in the SS7 network.

Security edge protection proxy (SEPP): a 5G network element that enables secure interconnect between 5G networks by performing secure signaling services, including message prioritization, throttling, overload protection and routing.

Update location request (ULR): Diameter message used to update the location of a subscriber in an HSS.

International mobile subscriber identity (IMSI): a unique identity or identifier of a mobile subscriber.

Timestamp information: Any data that records the date and time of an event (e.g., an attachment event or the receiving of a particular ingress signaling message).

BRIEF DESCRIPTION OF THE DRAWINGS

FIG. 4 is an exemplary mobile subscriber trajectory based database table utilized for validating location update messages for outbound roaming subscribers according to an embodiment of the subject matter described herein;

FIG. 5 is an exemplary mobile subscriber directional sliding window database table utilized for validating location update messages for outbound roaming subscribers according to an embodiment of the subject matter described herein.

DETAILED DESCRIPTION

Figure 1:
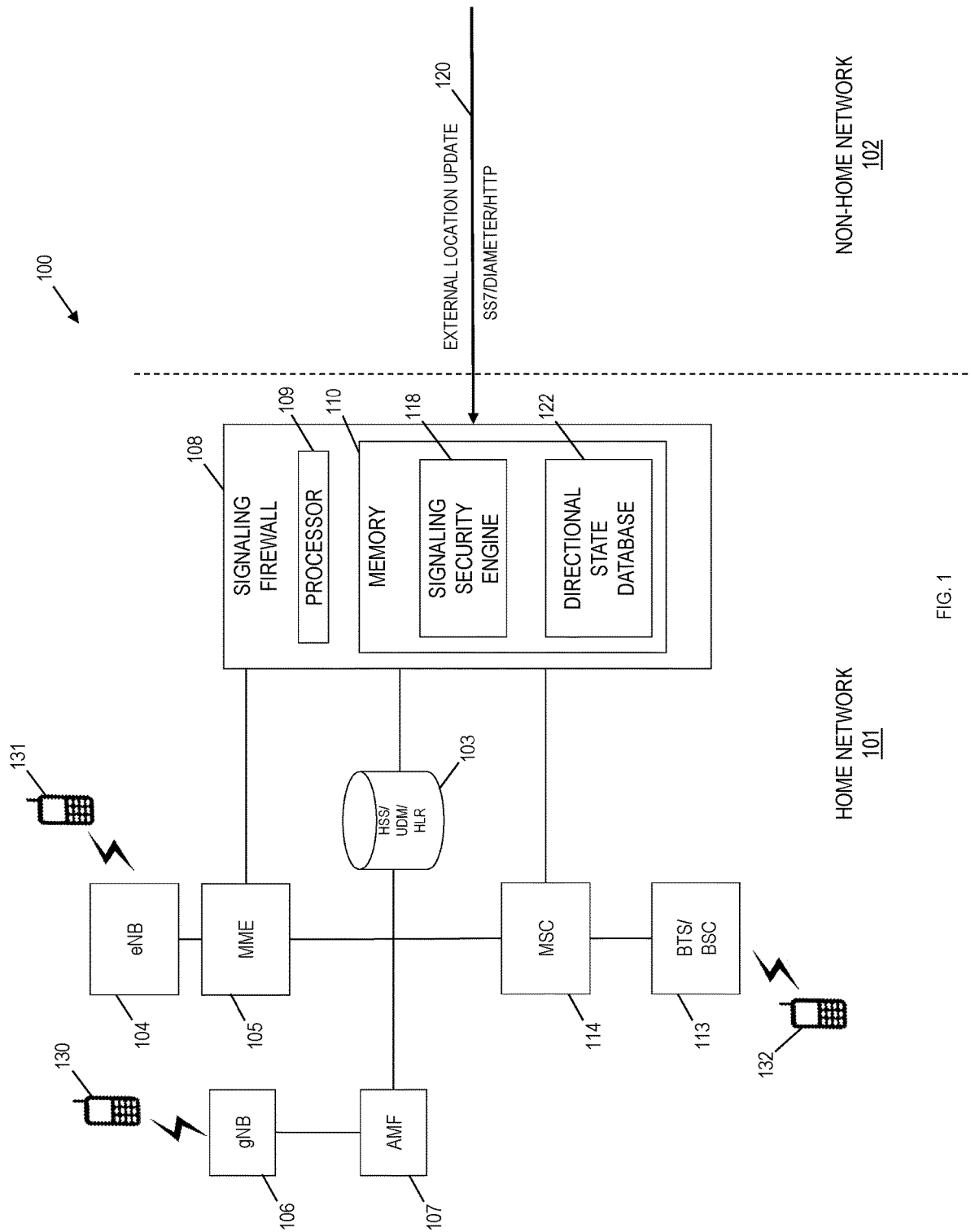
FIG. 1 is a block diagram illustrating an exemplary network for validating location update messages for outbound roaming subscribers according to an embodiment of the subject matter described herein.

Methods, systems, and computer readable media for validating location update messages for outbound mobile subscribers are disclosed. In particular, the disclosed subject matter presents a method and system that implements a location update validation technique performed at a signaling firewall element (e.g., such as a Diameter routing agent (DRA), a Diameter signaling router (DSR), a Diameter Edge Agent (DEA), a signaling transfer point (STP), a security edge protection proxy (SEPP), etc.) when the mobile subscriber roams outside of the home network into a visited non-home network. Notably, the disclosed system and method implements a location update message validation technique at the signaling firewall element.

As described herein, a location update message validation mechanism is used to mitigate the occurrence of fraudulent attacks when a user equipment belonging to a mobile subscriber roams from a home country (or home network) to a bordering country. As mentioned above, a location update message validation is a security countermeasure which determines the likelihood that a mobile subscriber is capable of moving or roaming from a first/home country to a bordering country based on its previous location(s) and trajectory. In particular, the security countermeasure is applicable to an outbound roaming mobile subscriber leaving a home network and is configured to compare the current location of the mobile subscriber with a predicted neighboring country location destination.

In some embodiments, the disclosed subject matter periodically or randomly (or a preconfigured time interval) collects a mobile subscriber's current location (e.g., cell identifier, location area code, a sector within a cell, or any combination thereof) within the home network. Notably, the mobile subscriber's location information can include a CID, a LAC identifier, a sector identifier, or any similar parameter/identifier. The collected subscriber cell level location parameter information is stored in a mobile subscriber directional state database provisioned on a signaling firewall located in the home network. In some embodiments, the location information can be maintained or processed using a directional sliding window that considers only the most recent subscriber location information (e.g., the last three or four cell identifiers corresponding to the mobile subscriber). Upon receiving new location information, a signaling security engine in the signaling firewall may utilize the stored location information to derive a probable or predicted directional trajectory movement of the user equipment carried by the mobile subscriber.

In some embodiments, the signaling security engine is further configured to validate a location update message from an external network supporting the mobile subscriber once the user equipment enters a neighboring country and/or network. For example, if a mobile subscriber crosses a border from a first/home country into a neighboring country, the signaling security engine is configured to execute a validation procedure. In some embodiments, the signaling security engine extracts a country code from the received location update message and determines if the indicated country (i.e., the border country) matches the predicted country designated in the directional state database. If a match is found, the signaling security engine in the signaling firewall (e.g., DSR, DEA, STP, SEPP, etc.) will validate the received location update message as being authentic. In contrast, if the signaling security engine fails to find a matching entry in the directional state database, the signaling security engine will mark the current ingress location update message from the foreign/visited network as being potentially suspicious.

FIG. 1 is a block diagram illustrating an exemplary communications network 100 that is configured to facilitate the communication of signaling messages among its network nodes. As shown in FIG. 1, communications network 100 comprises a home network 101 located in a home country and a non-home network 102 (e.g., a "visited network" or "foreign network") located in a bordering and/or neighboring country. As shown in FIG. 1, home network 101 can be configured to accommodate one or more different telecommunications network standards. For example, home network 101 can be configured to service a $5^{th}$ generation (5G) mobile subscriber user equipment 130 via the use of a next generation node B (gNB) 106, an AMF 107, and a UDM (i.e., represented as HSS/UDM/HLR 103). Likewise, home network 101 can also be configured to service a long term evolution (LTE) and/or $4^{th}$ generation (4G) mobile subscriber user equipment 131 via the use of an evolved node B (eNB) 104, a mobility management entity (MME) 105, and a HSS (i.e., represented as HSS/UDM/HLR 103). Further, home network 101 can be configured to serve a $3^{rd}$ generation (3G) mobile subscriber user equipment 132 via the use of a base transceiver station (BTS)/base station controller (BSC) 113, MSC 114, and an HLR (i.e., similar in function to HSS 103).

In some embodiments, each of user equipment 130-132 may include any device that is utilized directly by a mobile subscriber end-user to receive or transmit data, such as a hand-held smart phone, a GSM mobile station, a laptop computer equipped with a mobile broadband adapter, or the like. In some embodiments, 4G/LTE user equipment 131 is roaming in home network 101 and is communicatively connected (e.g. attached) to MME 105 via an eNodeB 104. For example, user equipment 131 can utilize a radio interface to establish a wireless connection with eNodeB 104, which in turn is connected to MME 105. Similar connections can be made using both 3G protocol (for example, 3G user equipment 132 communicating with MSC 114 via a wireless connection to BTS/BSC 113) and 5G protocol (for example, 5G user equipment 130 communicating with AMF 107 via a wireless connection to gNB 106). Thus, while signaling firewall 108 and signaling security engine 118 can be used with any telecommunications network standard as described above, the following systems and methods is described using a 4G/LTE example for the sake of clarity and without departing from the scope of the disclosed subject matter.

In some embodiments, MME 105 serves as a control-node for a long-term evolution (LTE) access-network (e.g., home network 101). MME 105 serves to monitor and manage the bearer activation/deactivation process and is responsible for selecting the signaling gateway (not shown) that services user equipment 131 at the initial attachment and during intra-LTE handovers. MME 105 is also responsible for authenticating the mobile subscriber associated with user equipment 131 (e.g., by interacting with the HSS). Specifically, MME 105 is communicatively coupled to HSS 103, which comprises a master subscription database for home network 101 of the mobile subscriber user. HSS 103 maintains records of user equipment (UE) devices that are registered to home network 101. In some embodiments, HSS 103 serves as the primary mobile subscriber database used within a IP Multimedia Subsystem (IMS) network and is configured to provide mobile subscriber details to other entities within the communications network 100. The use of HSS 103 allows a network to grant or refuse user access to different services dependent on the mobile subscriber's status.

In some embodiments, both MME 105 and HSS 103 are communicatively connected to signaling firewall 108. Signaling firewall 108 may include a router device or element (e.g., a DRA, a DEA, a DSR, an STP, a SEPP, etc.) that is configured to receive external location update messages 120, which may include signaling messages such as SS7, Diameter, or HTTP messages that enter home network 101 from a neighboring country or non-home network 102. For example, signaling firewall 108 can be configured to receive Diameter Update Location Request (ULR) messages. Likewise, signaling firewall 108 is further configured to receive SS7 mobile application part (MAP) location update request messages. Further, the signaling firewall 108 is configured to receive location update request messages or their equivalent in other mobile technologies and protocols.

FIG. 1 further depicts non-home network 102 of a neighboring country, which is configured to provide external location update messages 120. Notably, messages 120 may be sent from an external MME, MSC, or AMF that are configured to establish a connection with UEs roaming into non-home network 102 (e.g., a bordering country). As used herein, the term "location update request message" can refer to a Diameter based signaling message (e.g., a Diameter ULR message), an SS7 MAP location update request message, an HTTP location update request message, or any other request message used for updating a location of a mobile subscriber in a telecommunications network. In some embodiments, the Diameter ULR message is a S6a/d interface message that is used between the MME (and/or a Serving GPRS Support Node (SGSN)) and an HSS for the purposes of updating the location of the mobile subscriber's user equipment 131. For example, an external MME can similarly direct ULR messages (e.g., location update requests messages 120) to signaling firewall 108 in response to a user equipment roaming into non-home network 102.

In some embodiments, a ULR message and other location update request messages each includes an identifier, such as an IMSI, MSISDN, and/or IMEI, that identifies the mobile subscriber's user equipment. The ULR message may also include a visited public and mobile network (VPLMN) identifier, which identifies the mobile network operator (MNO) of the message sender. Further, a mobile country code (MCC) identifier, which identifies the country associated with the message sender, can be extracted from the VLPMN identifier included in the ULR message or other location update request message by the signaling firewall 108. In some embodiments, the ULR message can also include a mobile network code (MNC) identifier.

As shown in FIG. 1, signaling firewall 108 may include one or more processors 109, such as a central processing unit (e.g., a single core or multiple processing cores), a microprocessor, a microcontroller, a network processor, an application-specific integrated circuit (ASIC), or the like. Signaling firewall 108 may also include memory 110. Memory 110 may comprise random access memory (RAM), flash memory, a magnetic disk storage drive, and the like. In some embodiments, memory 110 may be configured to store a signaling security engine 118 and a directional state database 122. Notably, signaling security engine 118 in memory 110 can perform various monitoring, management, and/or remediation functionalities for signaling firewall 108 when executed by one or more processors 109.

In some embodiments, signaling security engine 118 can include a software component that is responsible for executing applying a location update message validation security countermeasure operation to ULR messages and other location update request messages received by signaling firewall 108. As described in greater detail below, signaling firewall 108 can receive an ingress location update message (i.e., ULR message) from an MME located in a bordering country (e.g., non-home network) in response to user equipment 131 entering or being activated in a border country, i.e., non-home network 102. For the purposes of this example, it is understood that user equipment 131 was attached to home network 101 at some time prior to entering non-home network 102. In some embodiments, the external MME communicates the ULR message (e.g., external location update message 120) to signaling firewall 108 via a Diameter S6a/d interface. In response to receiving the ULR message, signaling firewall 108 initiates signaling security engine 118, which is configured to extract the country code (e.g., MCC from a VPLMN identifier) from the ULR message and access directional state database 122. In particular, signaling security engine 118 is configured to cross reference the country code with entries in the directional state database 122. If the database entry associated with the roaming mobile subscriber indicates a "predicted country" that is designated as a high probability destination (i.e., that the mobile subscriber is moving towards that country and likely to cross the border), then signaling security engine 118 will validate the ingress ULR message. Otherwise, signaling security engine 118 will flag the external location update message as being suspicious.

In some embodiments, signaling security engine 118 is configured to identify the IMSI included in the received ingress Diameter message. Notably, the IMSI may include the MCC-MNC of the home network to which the user equipment belongs. Furthermore, signaling security engine 118 can be configured to subsequently extract one or more of the MNC identifier and/or VPLMN identifier from the IMSI (e.g., contained in ULR messages). In particular, signaling security engine 118 can examine the MCC of the IMSI in order to identify that the user equipment belongs to the home network. In addition, signaling security engine 118 may be configured to extract the MCC identifier from the VPLMN identifier in order to identify the MCC of the non-home network (e.g., border country). Once the country code identifier is extracted from the ingress Diameter message, signaling security engine 118 records the location identification data (and the timestamp information) in local storage or in buffer memory.

In some embodiments, signaling security engine 118 is configured to periodically or randomly (or via a preconfigured time interval) send Any Time Interrogation (ATI) messages towards the home network HSS in order to obtain current location information associated with the mobile subscriber's user equipment. In response, the home network HLR will send a Provide Subscriber Information (PSI) request towards the last known MSC/MSC (in example SS7 domain) that was servicing the roaming mobile subscriber. In particular, the PSI request queries for the mobile subscriber's cell identifier (CID) and location area code (LAC). A detailed description of this UE location information acquisition process is described below and shown in FIG. 2. Similarly in the 4G domain, an Insert Subscriber Data Request (IDR) or Provide Location Request (PLR) messages can be utilized to acquire UE and/or mobile subscriber location information. Likewise, in the 5G domain, a Namf_Location_ProvidePositioningInfo Request or similar request message may be used to obtain the UE and/or mobile subscriber location information.

Figure 2:
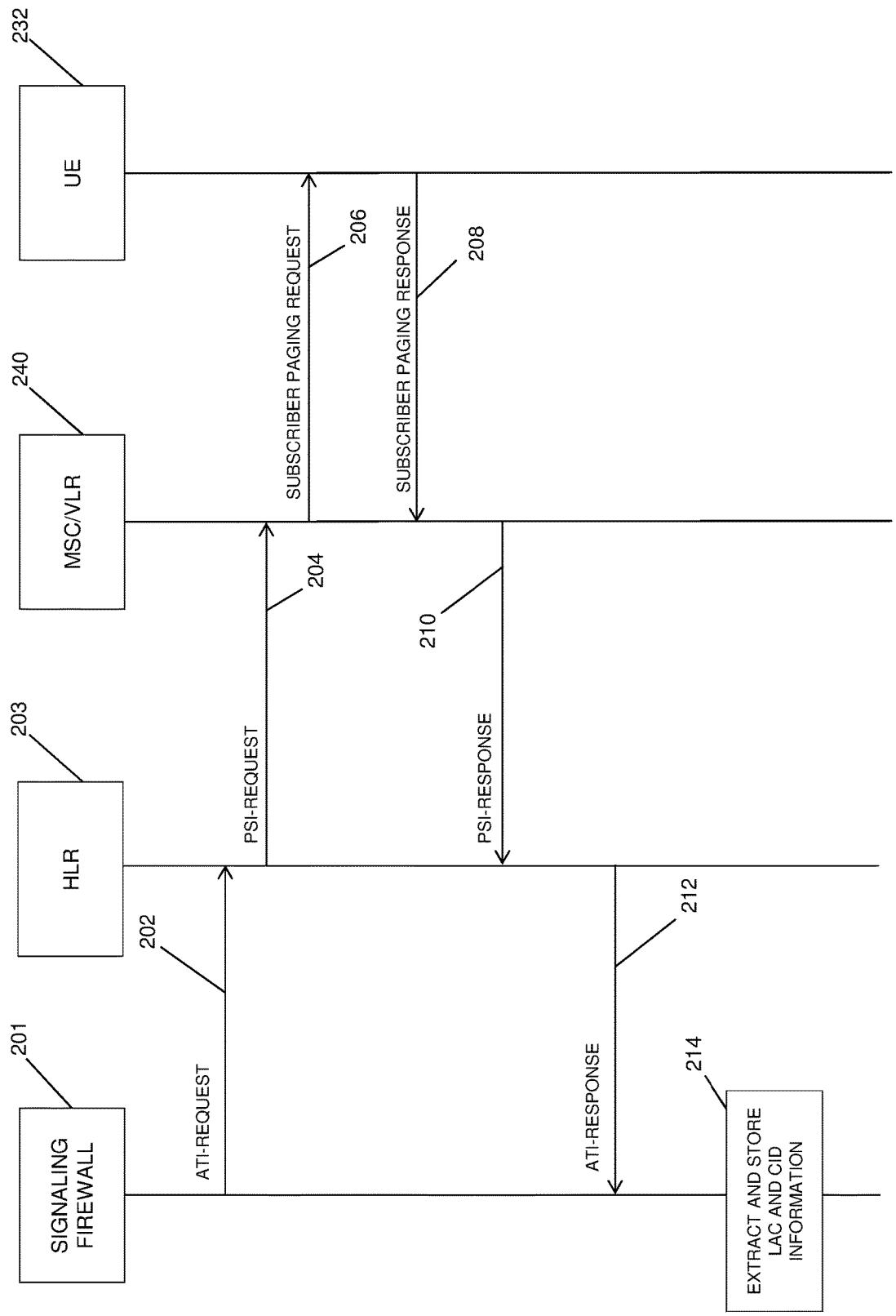
FIG. 2 is a signaling diagram illustrating the real time signaling request for user equipment location information for use in the validation of location update messages according to an embodiment of the subject matter described herein.

FIG. 2 is a signaling diagram illustrating the real time request and receiving of mobile subscriber directional location information for use in validating location update messages according to an embodiment of the subject matter described herein. In particular, FIG. 2 illustrates a mobile subscriber directional trajectory information collection that is conducted in example SS7 domain. For example, signaling firewall 201 (which is similar to signaling firewall 108 shown in FIG. 1) is configured to send an SS7 ATI message 202 to a home network HLR 203. Notably, signaling firewall 201 can send the ATI messages toward the home network HLR 203 at a predefined periodic time interval or a varying time interval. In response to receiving the ATI message 202, HLR 203 is configured to send an SS7 PSI request message 204 to the last known MSC/VLR that was servicing the roaming mobile subscriber. In particular, PSI request message 204 serves as a request for cell identifier (CID) information and location area code (LAC) information associated with the cell and service area that is providing service to the mobile subscriber. Notably, in this example, the CID may be a unique identification number that is used to identify a base transceiver station (BTS) or sector of a BTS within a service area (which is identified by the LAC) After receiving PSI request message 204, serving MSC/VLR 240 initiates a subscriber paging request message 206 that is directed to the user equipment 232 of the mobile subscriber. Upon receiving the subscriber paging request message 206, user equipment 232 of the mobile subscriber will promptly send a subscriber paging response message 208, which contains the mobile subscriber's current CID and LAC information. After the subscriber paging response message 208 is received by MSC/VLR 240, the MSC extracts the CID and LAC information from the received message 208 and generates a SS7 PSI response message 210. Notably, the PSI response message 210 contains the CID and the LAC information associated with the mobile subscriber and is sent to HLR 203. Similarly, HLR 203 obtains the CID and the LAC information from the PSI response message 210 and includes the extracted information in an SS7 ATI response message 212 that is directed to the home network. In particular, signaling firewall 201 in the home network receives the ATI response message 212. After receiving the ATI response message 212, a signaling security engine in the signaling firewall 201 extracts the CID and LAC information from the message 212 and subsequently stores the data in the directional state database. As such, the signaling security engine can extract CID and LAC information corresponding to a mobile subscriber at any instance or frequency in order to populate a database entry for the mobile subscriber in the directional state database (e.g., block 214).

Figure 3:
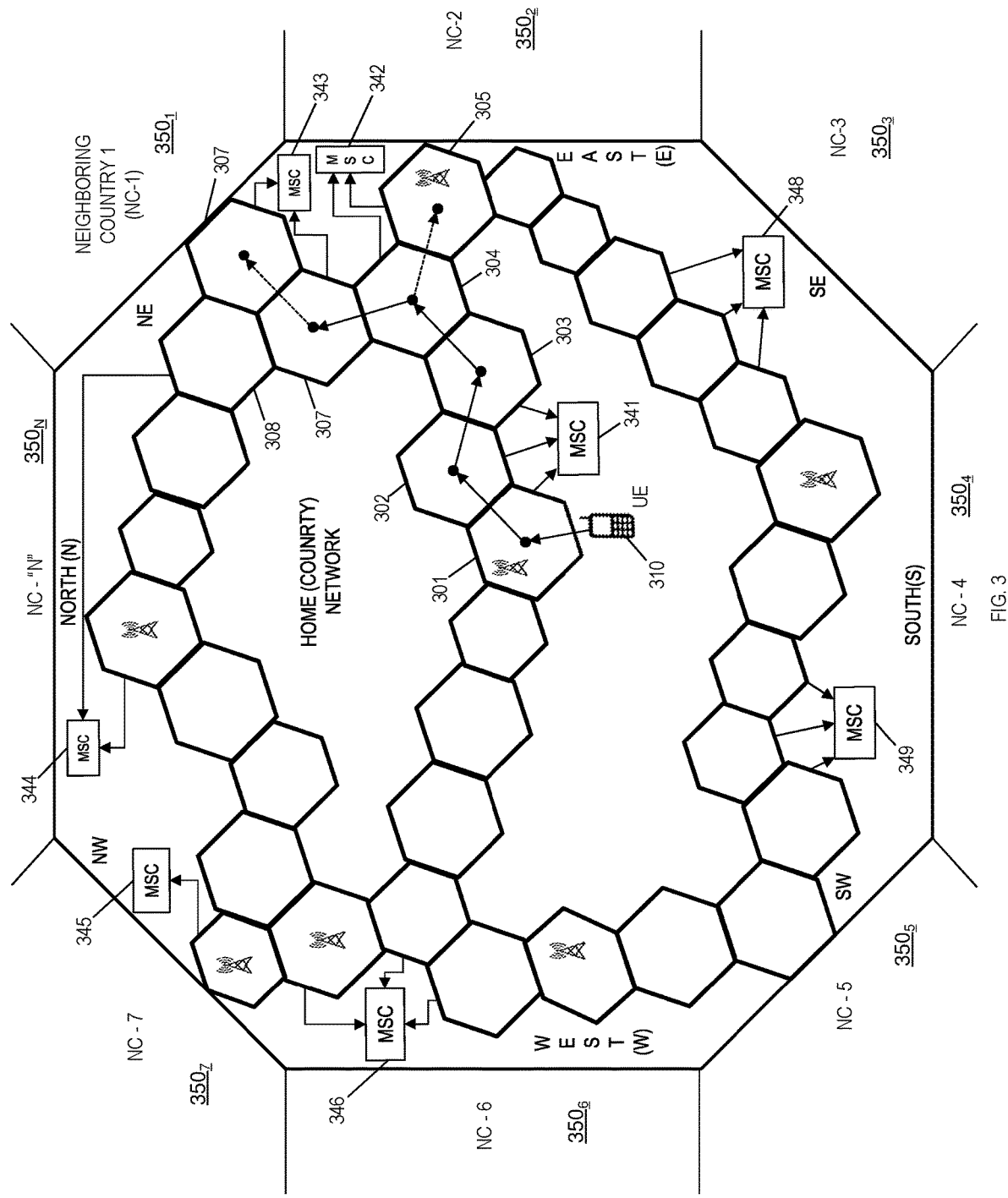
FIG. 3 is a diagram of a home network in a home country that is surrounded by a plurality of neighboring country networks according to an embodiment of the subject matter described herein.

FIG. 3 is a diagram of a home network 300 is surrounded by a plurality of neighboring countries $350_{1...N}$ according to an embodiment of the subject matter described herein. In particular, FIG. 3 illustrates a home country that is represented by a home network 300. Notably, home network 300 is surrounded by "N" number of neighboring countries (NC) $350_{1...N}$. FIG. 3 also illustrates a plurality of cells (e.g., example cells 301-308) within home network 300 that represent areas of cellular service for a mobile subscriber's user equipment 310. Notably, a signaling firewall (not shown) positioned in home network 300 is configured to receive signaling messages from each of MSCs 341-347, which are responsible for providing service to the cells throughout network 300. Although FIG. 3 only depicts seven (7) MSCs, it is understood that additional (or fewer) MSCs can be utilized without departing from the scope of the disclosed subject matter. In particular, the signaling firewall can be configured to send ATI request messages (in an example SS7 domain) to a home network HLR (not shown), which in turn is adapted to determine the last MSC that provided service and support to user equipment 310. For example, user equipment 310 may have initially registered with MSC 341 while roaming in cell 301. During the registration process, MSC 341 is configured to obtain the CID and LAC associated with cell 301. In particular, MSC 341 can store this location information in a local VLR along with some identifier (e.g., IMSI) corresponding to user equipment 310 and/or the mobile subscriber. As user equipment 310 physically travels through home network 300 by traversing through cells 302-304, signaling firewall may be configured to periodically (or randomly) request and obtain CID and LAC information from user equipment 310 and its current serving MSC (e.g., MSC 341 while UE 310 is in cells 301-303 and MSC 342 when UE 310 is in cell 304). Each time the signaling firewall obtains the CID and LAC information, the signaling firewall (and/or the signaling security engine) may store this location information in a local directional state database (e.g., directional state database 122 as shown in FIG. 1). At this stage, the signaling security engine in signaling firewall is configured to utilize the CID and LAC information to predict a neighboring country that the user device equipment 310 may enter. For example, the signaling security engine may comprise an algorithm that maps the mobile subscriber's trajectory direction and assigns appropriate weights based on a degree or level of confidence. In some embodiments, the more weight that is assigned to a border country, the higher the confidence that the predicted country is the mobile subscriber's destination. In some embodiments, the signaling security engine can use a color-coded system (or other like system) to indicate a predicted neighboring country. The use of one such color coded system is illustrated in FIG. 4 as a subscriber trajectory database table 400 (see below). In some embodiments, the signaling security engine can use a color-coded system (or other like system) to indicate a predicted neighboring country. The use of one such color coded system is illustrated in FIG. 4 as a subscriber trajectory database table 400 (see below). At this stage, the signaling security engine has utilized the CID and LAC information of the cell 304 to impose on the route decision tree for cell 304 to predict that user equipment 310 is most likely to enter neighboring country $350_2$ (i.e., NC-2) and thereby predicted to proceed into cell 305 (as indicated by the dotted arrow in FIG. 3) based on sliding window based trajectory pattern for that subscriber. Instead, in this scenario, user equipment 310 proceeds to the north and enters cell 306. At this time, the signaling security engine utilizes the most recent CID and LAC information to determine that user equipment 310 is heading in a northeast direction and is now likely to enter neighboring country $350_1$ (e.g., NC-1) via cell 307. In some embodiments, the signaling security engine 118 utilizes a directional sliding window that can assign more weight to the most recent directional trajectory information (e.g., the last 3 location information entries).

For example, in many instances, each individual mobile subscriber can be attached to a particular CID more often or frequent than other CIDs (e.g., the CID corresponding to the mobile subscriber's home location or work location). This frequently obtained CID may be referred to as the "reference CID" for that particular mobile subscriber. In some embodiments, a subscriber directional state database table 500 as shown in FIG. 5 can be configured to store the last "X" mobility pattern window entries for the mobile subscriber (see column 502) for that reference CID (e.g., the last 3 cell CIDs including the reference CID) as shown in columns 504 and 506. In FIG. 5, the reference CID for this example is "303", which corresponds to cell 303 indicated in FIG. 3. Notably, this reference cell ID is created over time based on the signaling security engine learning from the previous movement patterns (corresponding to received UE location information) of the mobile subscriber. Based on the last known CID from the query (e.g., Subscriber paging request message) from the MSC/VLR, the signaling security engine will derive a prediction for a most probable direction and/or country that the mobile subscriber is moving toward (see column 512). Based on this prediction, a weight or color code associated with that direction is adjusted (e.g., increased or decreased) (e.g., column 510). In some embodiments, the weight is represented as a percentage or a numerical value. However, if the next cell ID window pattern changes within a next new cell movement, the weight and/or color is immediately updated to indicate the most possible expected direction or country the mobile subscriber is moving toward.

After user equipment 310 actually crosses the border between home country network 300 and neighboring country $350_1$ (e.g., NC-1), a foreign-based MSC in a foreign network supporting neighboring country $350_1$ may be configured to send a location update message that is received by the signaling firewall in the mobile subscriber's home network. In such an embodiment, the signaling security engine will process the location update message and extract a country code from the received message. Once the country code is obtained, the signaling security engine is configured to utilize a mobile subscriber identifier and the country code to access the directional state database in an attempt to find a matching entry. In particular, signaling security engine will compare the country code obtained from the location update message with entries in the directional state database in an attempt to identify a neighboring country that has been designated by a green color code (i.e., indicative of a neighboring country that the mobile subscriber was highly probable to enter based on its previous trajectory). If such a match is found, then the location update message is validated by the signaling security engine. In this specific instance, user equipment 310 entered neighboring country $350_1$ (e.g., NC-1) and the resulting location update request message received by the signaling security engine contained a country code for neighboring country $350_1$. Further, subscriber trajectory database table 400 as shown in FIG. 4 below depicts that neighboring country NC-1 is associated with a green color code designation, thereby indicating country NC-1 was the most likely country that user equipment 310 would enter. Since "NC-1" is found to be a match (with respect to the received country code and the table 400 entry), the location update message received from the foreign MSC is validated by the signaling firewall and/or the signaling security engine in the home network.

More specifically, FIG. 4 is an exemplary mobile subscriber trajectory database table 400 (e.g., similar to the directional state database 122 shown in FIG. 1) utilized for validating location update messages for outbound roaming mobile subscribers according to an embodiment of the subject matter described herein. As shown in FIG. 4, mobile subscriber trajectory database table 400 includes a plurality of column data. Notably, mobile subscriber trajectory database table 400 represents a database entry for a single mobile subscriber and an associated home country network. Specifically, mobile subscriber trajectory database table 400 includes a mobile subscriber identifier 402 (e.g., a hashed subscriber identifier) and a direction column 404 that contains a plurality of different directions in which a neighboring country may be located in relation to the current/home network country. As illustrated in FIG. 4, direction column 404 of database table 400 indicates the directions North, South, East, West, Northeast, Southeast, Southwest, and Northwest. Although eight (8) directions are shown in column 404 of database table 400, additional (or fewer) directions may be represented without departing from the scope of the disclosed subject matter.

Table 400 further includes a neighboring country column 406 that lists all of the countries that neighbor the current/home network country. Notably, the neighboring countries listed in column 406 are mapped to the direction entries of column 404 (e.g., neighboring country NC-6 is located to the West as also shown in FIG. 3). Further, mobile subscriber trajectory database table 400 includes a color-code column 408 by which the signaling security engine uses to assign a specific color to each of the neighboring countries. Although two (2) colors are represented in column 408 of database table 400, additional colors may be used to represent varying likelihoods and/or probabilities without departing from the scope of the disclosed subject matter. In alternate embodiments, a numerical (e.g., a percentile based) designation can be utilized to represent varying likelihoods and/or probabilities without departing from the scope of the disclosed subject matter. In some embodiments, the signaling security engine is configured to access database table 400 by using a mobile subscriber identifier and a corresponding country code identifier (e.g., MCC identifier) included in location update request messages received from foreign networks to determine whether the received location update request message is to be validated or designated as being suspicious as described herein.

In this example, a green color code designation in column 408 indicates a high probability that the mobile subscriber is moving towards the associated/mapped neighboring country. In contrast, a red color code designation in column 408 indicates a low likelihood that the mobile subscriber is moving towards the associated neighboring country. As shown in FIG. 4, column 408 in table 400 indicates that the mobile subscriber is traveling in a northeast direction and is likely to enter neighboring country $350_1$ (i.e., NC-1) also shown in FIG. 3.

Figure 6:
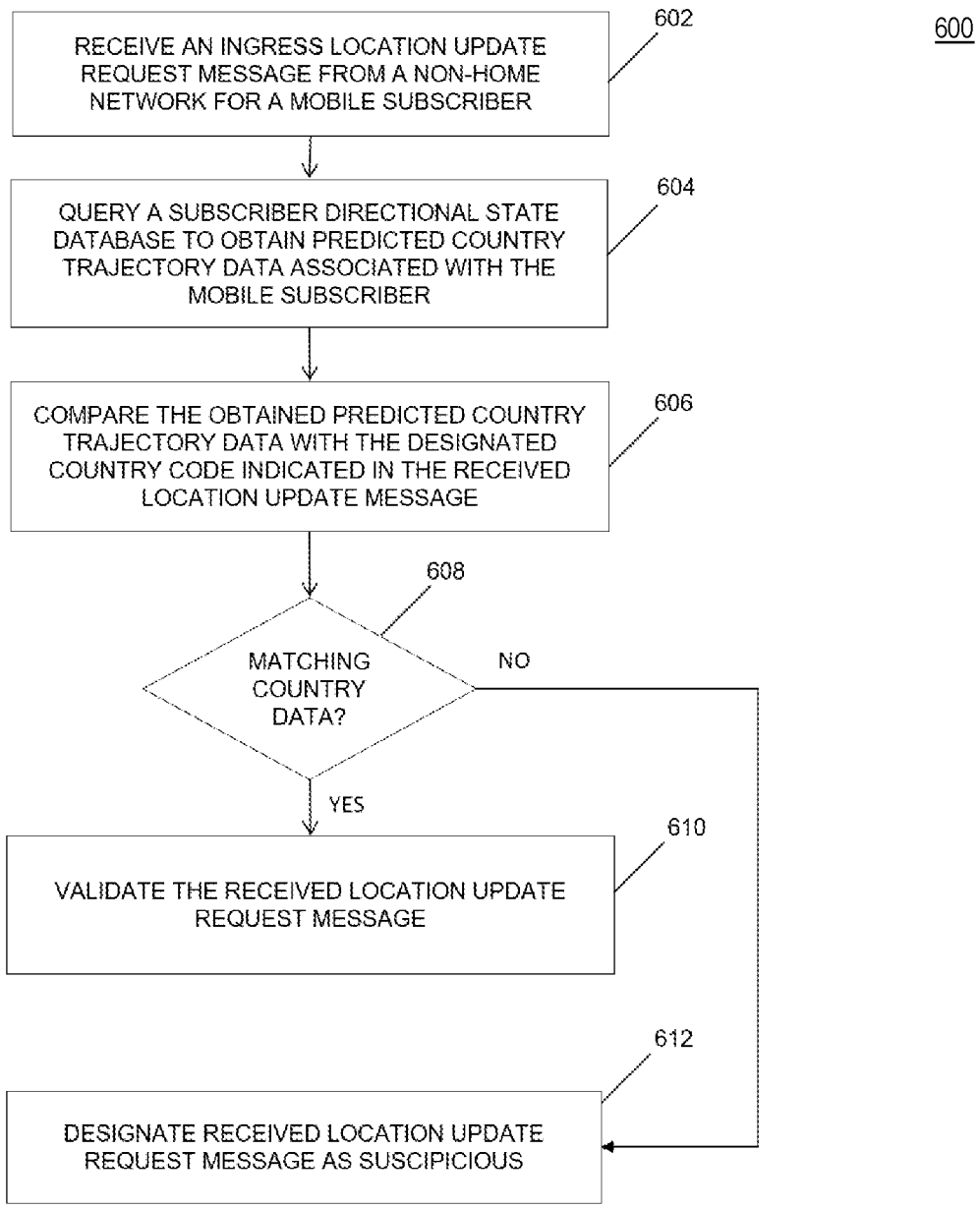
FIG. 6 is a flow chart illustrating an exemplary process for validating location update messages for outbound roaming subscribers according to an embodiment of the subject matter described herein.

FIG. 6 is a flow chart illustrating an exemplary process or method 600 for validating location update messages using a signaling firewall and/or a signaling security engine according to an embodiment of the subject matter described herein. In some embodiments, method 600 depicted in FIG. 6 is an algorithm stored in memory that when executed by a hardware processor of a signaling firewall (e.g., a DSR, an STP, SEPP, etc.) performs steps 602-612. In block 602, an ingress location update request message (e.g., a Diameter ULR message) related to a mobile subscriber is received from a non-home network (e.g., a foreign network located in a country bordering the country containing the home network). In some embodiments, the ingress location update request message may be received from an MME, MSC, or an AMF in the foreign network of the neighboring country.

In block 604, a mobile subscriber directional state database is queried to obtain a predicted country trajectory data. In some embodiments, the signaling security engine in the signaling firewall is configured to extract the mobile subscriber information from the received location update request message. Once the obtained from the location update request message, the mobile subscriber information can be utilized by the signaling security engine to access the directional state database and obtain the predicted country trajectory data that indicates the probable or predicted border country that the mobile subscriber will enter. For example, as indicated in FIG. 4, database table 400 maps/associates different color codes with a plurality of neighboring countries for a particular mobile subscriber. Notably, the neighboring countries that are determined to have a high probability of the mobile subscriber entering (i.e., cross the border) are designated with a green color code. Likewise, the neighboring countries that have been determined to have a low probability or likelihood of the mobile subscriber entering is designated with a red color code.

In block 606, the signaling security engine compares the country code information extracted from the location update request message (e.g., received in block 602) with the probable country designated by the predicted country trajectory data (e.g., accessed in block 604). In the event that signaling security engine determines that a match between the country code information and the country indicated by the predicted country trajectory data exists, then method 600 continues to block 610. Otherwise, method 600 proceeds to block 612.

In block 610, the signaling security engine finds a match and subsequently validates the ingress location update request message (e.g., that was received in block 602).

In block 612, the signaling security engine does not find a match and subsequently designates or tags the ingress location update request message as a suspicious ingress message. If the ingress location update request message is designated as a suspicious ingress message, the security engine in the signaling firewall can reject the ingress location update request message, thereby preventing potentially fraudulent activities. Further, the security engine can also issue an alert signal or message to a network operator in the event the ingress location update request message is designated.

Advantages of the subject matter described herein include the ability to be deployed and operational at a signaling firewall, such as a Diameter signaling router (DSR), Diameter routing agent, an STP, an SEPP, and the like. Deploying the location update message validation method at the signaling firewall enables a signaling firewall to implement the described location update message validation security countermeasure in a manner that is able to identify suspicious messaging and/or prevent fraudulent attacks without having to rely solely on time-distance feasibility checks. Notably, the disclosed subject matter greatly assists with providing a security countermeasure for scenarios involving mobile subscribers near country borders where the traditional time-distance checks can fail. As such, a signaling firewall configured to perform the location update message validation security countermeasure as described herein improves the technological field of computer network security by reducing the likelihood of fraud and other types of signaling attacks on computer networks in a more efficient manner.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for validating location update request messages, the method comprising:

receiving, by a signaling firewall from a non-home network, an ingress location update request message related to a mobile subscriber;

querying a directional state database to obtain predicted country trajectory data associated with the mobile subscriber, wherein the predicted country trajectory data is utilized to identify a trajectory direction of a user equipment corresponding to the mobile subscriber that is used to indicate a predicted country that is a most probable destination for the user equipment, wherein the trajectory direction is identified using a plurality of mobility pattern window entries that is stored in the directional state database and indicates previous movement patterns of the user equipment, wherein the trajectory direction is identified using a plurality of location entries stored in the directional state database and assigning more weight to a most recent trajectory comprising a most recent three location entries of the plurality of location entries, wherein indicating the predicted country is based on a location of the predicted country relative to the trajectory direction, wherein indicating the predicted country is based on a determined level of confidence for the predicted country;

comparing the predicted country with country code information included in the ingress location update request message; and validating the ingress location update request message if the predicted country and the country code information match.

2. The method of claim 1 comprising designating the ingress location update request message as suspicious if the predicted country trajectory data and the country code information are different.

3. The method of claim 1 wherein the ingress location update request message is a Diameter update location request (ULR) message or a SS7 location update request message.

4. The method of claim 1 wherein the signaling firewall includes a Diameter routing agent (DRA), a Diameter signaling router (DSR), a signal transfer point (STP), a security edge protection proxy (SEPP).

5. The method of claim 1 comprising sending, by the signaling firewall, an alert message to a network operator in response to determining that the predicted country trajectory data and the country code information are different.

6. The method of claim 1 comprising extracting a mobile country code (MCC) identifier from an international mobile subscriber identity (IMSI) included in the ingress location update request message to identify a country associated with the non-home network.

7. The method of claim 1 wherein the directional state database is provisioned with user equipment location information associated with the mobile subscriber.

8. The method of claim 7 wherein the user equipment location information includes at least one of cell identifier (CID), a location area code (LAC) identifier, or a sector identifier.

9. The method of claim 7 wherein the signaling firewall is configured to send Any Time Interrogation (ATI) messages to request the user equipment location information on a periodic basis, random basis, or preconfigured time interval.

10. A system for validating location update request messages, the system comprising:

a signaling firewall including at least one processor;

a directional state database local to the signaling firewall for storing location information related to a mobile subscriber; and a security signaling engine stored in memory of the signaling firewall and implemented using the at least one processor for receiving from a non-home network an ingress location update request message related to a mobile subscriber, querying a directional state database to obtain predicted country trajectory data associated with the mobile subscriber, wherein the predicted country trajectory data is utilized to identify a trajectory direction of a user equipment corresponding to the mobile subscriber that is used to indicate a predicted country that is a most probable destination for the user equipment, wherein the trajectory direction is identified using a plurality of mobility pattern window entries that is stored in the directional state database and indicates previous movement patterns of the user equipment, wherein the trajectory direction is identified using a plurality of location entries stored in the directional state database and assigning more weight to a most recent trajectory comprising a most recent three location entries of the plurality of location entries, wherein indicating the predicted country is based on a location of the predicted country relative to the trajectory direction, wherein indicating the predicted country is based on a determined level of confidence for the predicted country, comparing the predicted country with country code information included in the ingress location update request message, and validating the ingress location update request message if the predicted country and the country code information match.

11. The system of claim 10 comprising designating the ingress location update request message as suspicious if the predicted country trajectory data and the country code information are different.

12. The system of claim 10 wherein the ingress location update request message is a Diameter update location request (ULR) message or an SS7 location update request message.

13. The system of claim 10 wherein the signaling firewall includes a Diameter routing agent (DRA), a Diameter signaling router (DSR), a signal transfer point (STP), a security edge protection proxy (SEPP).

14. The system of claim 10 comprising sending, by the signaling firewall, an alert message to a network operator in response to determining that the predicted country trajectory data and the country code information are different.

15. The system of claim 10 comprising extracting a mobile country code (MCC) identifier from an international mobile subscriber identity (IMSI) included in the ingress location update request message to identify a country associated with the non-home network.

16. The system of claim 10 wherein the directional state database is provisioned with user equipment location information associated with the mobile subscriber.

17. The system of claim 16 wherein the user equipment location information includes at least one of cell identifier (CID), a location area code (LAC) identifier, or a sector identifier.

18. The system of claim 16 wherein the signaling firewall is configured to send Any Time Interrogation (ATI) messages to request the user equipment location information on a periodic basis, random basis, or preconfigured time interval.

19. A non-transitory computer readable medium having stored thereon executable instructions that when executed by a processor of a computer controls the computer to perform steps comprising:
receiving, by a signaling firewall from a non-home network, an ingress location update request message related to a mobile subscriber;
querying a directional state database to obtain predicted country trajectory data associated with the mobile subscriber, wherein the predicted country trajectory data is utilized to identify a trajectory direction of a user equipment corresponding to the mobile subscriber that is used to indicate a predicted country that is a most probable destination for the user equipment, wherein the trajectory direction is identified using a plurality of mobility pattern window entries that is stored in the directional state database and indicates previous movement patterns of the user equipment, wherein the trajectory direction is identified using a plurality of location entries stored in the directional state database and assigning more weight to a most recent trajectory comprising a most recent three location entries of the plurality of location entries, wherein indicating the predicted country is based on a location of the predicted country relative to the trajectory direction, wherein indicating the predicted country is based on a determined level of confidence for the predicted country;
comparing the predicted country with country code information included in the ingress location update request message;
validating the ingress location update request message if the predicted country and the country code information match; and
designating the ingress location update request message as suspicious if the predicted country and the country code information are different.

20. The non-transitory computer readable medium of claim 19 comprising designating the ingress location update request message as suspicious if the predicted country trajectory data and the country code information are different.

* * * * *

UNITED STATES PATENT AND TRADEMARK OFFICE
CERTIFICATE OF CORRECTION

PATENT NO. : 11,770,694 B2
APPLICATION NO. : 17/099683
DATED : September 26, 2023
INVENTOR(S) : Rajavelu Page 1 of 3

It is certified that error appears in the above-identified patent and that said Letters Patent is hereby corrected as shown below:

On the Title Page

Column 2, item (56) under Other Publications, Line 4, delete "Fowarding" and insert -- Forwarding --, therefor.

On Page 4, Column 1, item (56) under Foreign Patent Documents, Line 1, delete "2010/021386" and insert -- 2010/021886 --, therefor.

On Page 4, Column 2, item (56) under Other Publications, Line 33, delete "(Unpublished" and insert -- (Unpublished, --, therefor.

On Page 4, Column 2, item (56) under Other Publications, Line 55, delete "Digitial" and insert -- Digital --, therefor.

On Page 4, Column 2, item (56) under Other Publications, Line 59, delete "SLq" and insert -- SLg --, therefor.

On Page 4, Column 2, item (56) under Other Publications, Line 63, delete "EDG" and insert -- EDGE --, therefor.

On Page 5, Column 1, item (56) under Other Publications, Line 50, delete "Tel!" and insert -- Tell --, therefor.

On Page 5, Column 2, item (56) under Other Publications, Line 71, delete "1-258" and insert -- 1-253 --, therefor.

On Page 6, Column 1, item (56) under Other Publications, Line 2, delete "1-253" and insert -- 1-98 --, therefor.

On Page 6, Column 1, item (56) under Other Publications, Line 5, delete "29.573," and insert Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,770,694 B2

-- 29.572, --, therefor

On Page 6, Column 1, item (56) under Other Publications, Line 9, delete "29.518" and insert -- 29.518, --, therefor.

On Page 6, Column 1, item (56) under Other Publications, Line 12, delete "architecturee" and insert -- architecture --, therefor.

On Page 6, Column 1, item (56) under Other Publications, Line 16, delete "Tel!" and insert -- Tell --, therefor.

On Page 6, Column 1, item (56) under Other Publications, Line 17, delete "dir/." and insert -- dlr/. --, therefor.

On Page 7, Column 1, item (56) under Other Publications, Line 42, delete "Examiners" and insert -- Examiner's --, therefor.

On Page 7, Column 1, item (56) under Other Publications, Line 46, delete "15/376,631" and insert -- 15/408,155 --, therefor.

On Page 7, Column 2, item (56) under Other Publications, Line 38, delete ""Digitial" and insert -- "Digital --, therefor.

On Page 7, Column 2, item (56) under Other Publications, Line 65, delete "(LCS):" and insert -- (LCS); --, therefor On Page 8, Column 1, item (56) under Other Publications, Line 35, delete "Meterlng.com," and insert -- Metering.com, --, therefor.

On Page 8, Column 1, item (56) under Other Publications, Line 38, delete "Internatioanl" and insert -- International --, therefor.

On Page 8, Column 1, item (56) under Other Publications, Line 46, delete "Project:" and insert -- Project; --, therefor.

On Page 8, Column 1, item (56) under Other Publications, Line 50, delete "1-52" and insert -- 1-57 --, therefor.

On Page 8, Column 1, item (56) under Other Publications, Line 51, delete "Generatian" and insert -- Generation --, therefor.

On Page 8, Column 1, item (56) under Other Publications, Line 61, delete "3GPTT" and insert -- 3GPP --, therefor.

On Page 8, Column 2, item (56) under Other Publications, Line 5, delete "201947647367" and insert -- 201947047367 --, therefor.

CERTIFICATE OF CORRECTION (continued)
U.S. Pat. No. 11,770,694 B2

On Page 8, Column 2, item (56) under Other Publications, Line 47, delete "Aspects:" and insert -- Aspects; --, therefor.

In the Drawings

On sheet 6 of 6, in FIG. 6, under Reference Numeral 612, Line 2, delete "SUSCIPICIOUS" and insert -- SUSPICIOUS --, therefor.

In the Specification

In Column 2, Line 57, delete "In" and insert -- in --, therefor.

In Column 3, Line 45, delete "a-transitory" and insert -- a non-transitory --, therefor.

In Column 9, Line 27, delete "LAC)" and insert -- LAC). --, therefor.